Sept. 28, 1965 C. A. MEAD ETAL 3,209,247
DIELECTRIC LOSS TYPE MOISTURE MEASUREMENT SYSTEM
WITH ITS OUTPUT COMPARED AGAINST
A REFERENCE LEVEL
Filed Oct. 19, 1960 3 Sheets-Sheet 1

*INVENTORS*
CARVER A. MEAD
MARVIN L. McBRAYER
BY PAUL H. CONROY

*Lilly & Nyhagen*
ATTORNEYS

Sept. 28, 1965 C. A. MEAD ETAL 3,209,247
DIELECTRIC LOSS TYPE MOISTURE MEASUREMENT SYSTEM
WITH ITS OUTPUT COMPARED AGAINST
A REFERENCE LEVEL
Filed Oct. 19, 1960 3 Sheets-Sheet 2
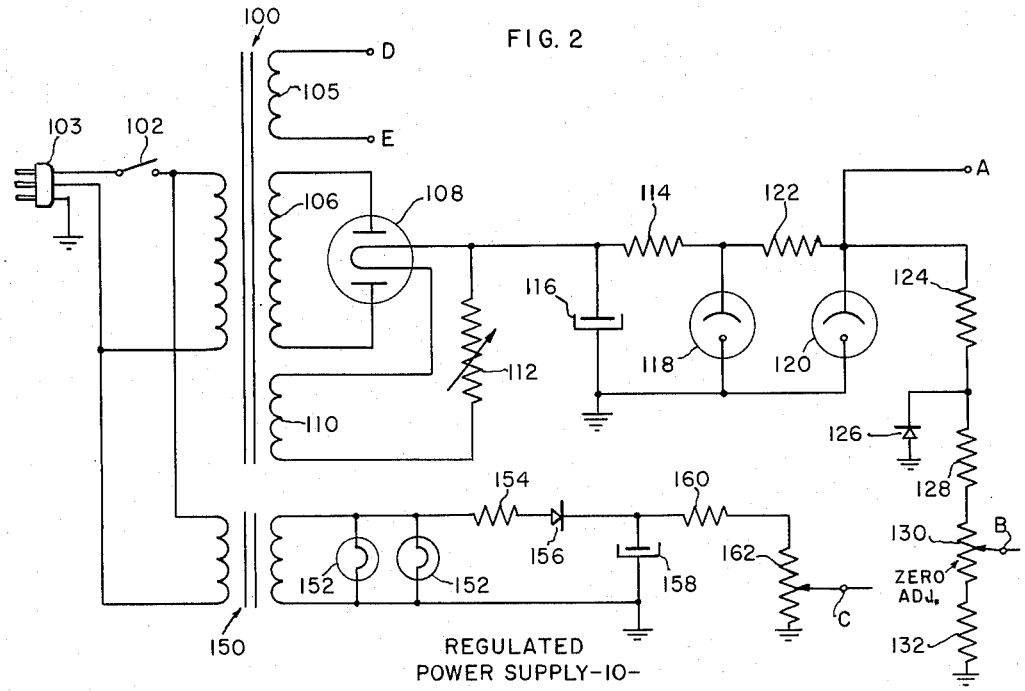
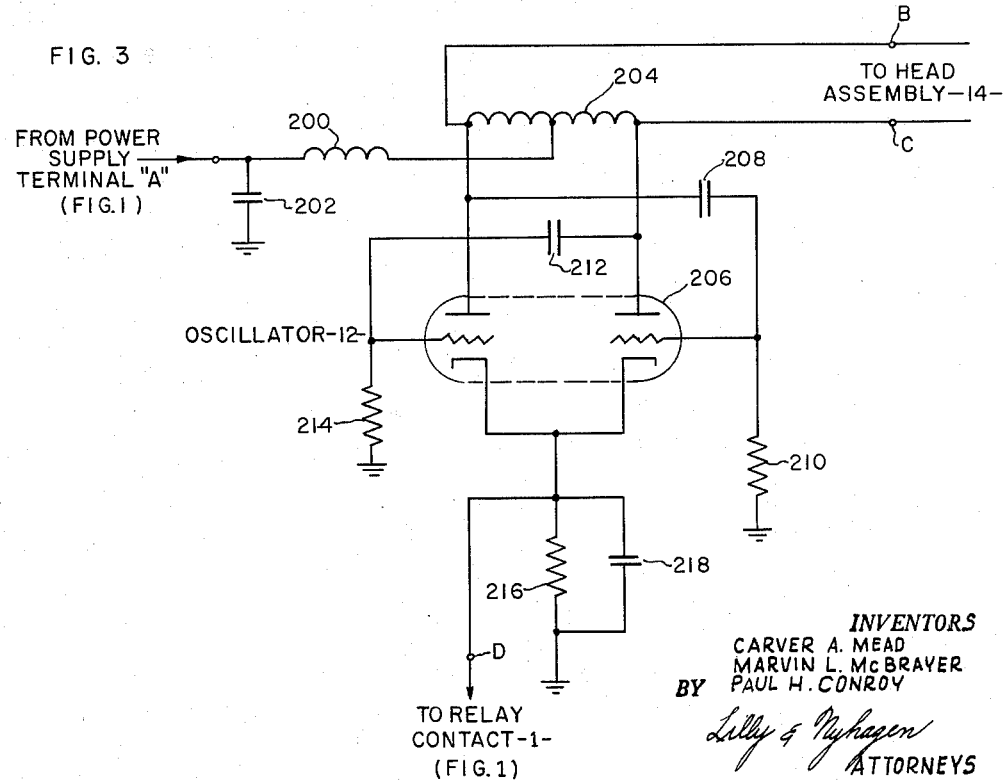
INVENTORS
CARVER A. MEAD
MARVIN L. McBRAYER
BY PAUL H. CONROY
*Lilly & Nyhagen*
ATTORNEYS

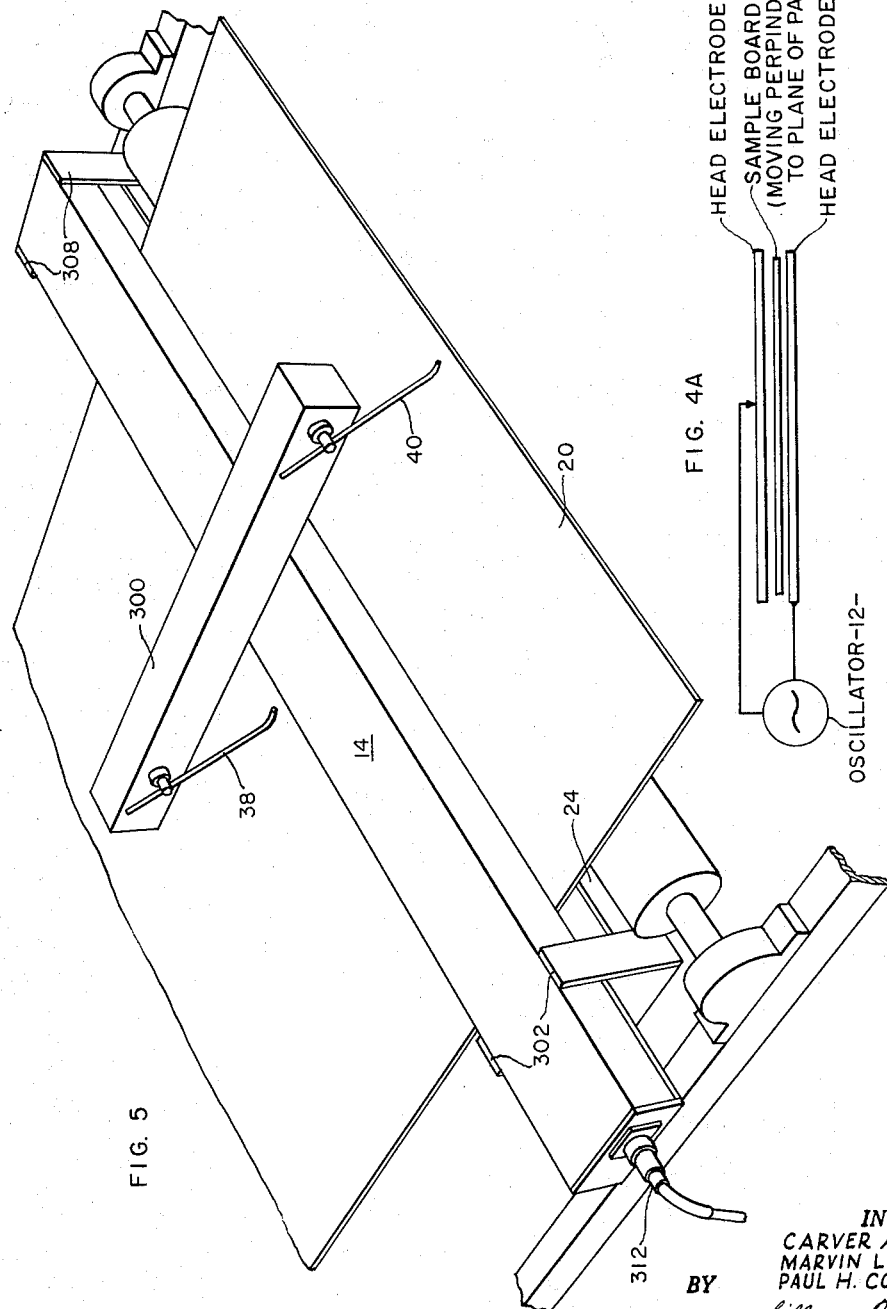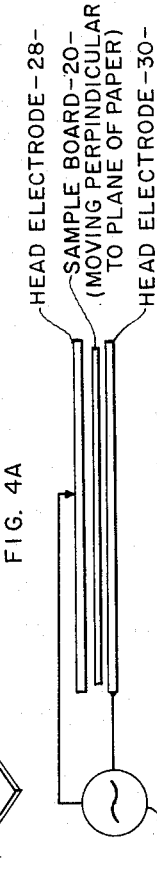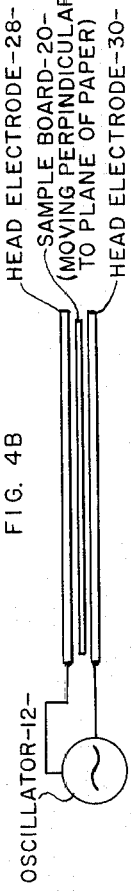

United States Patent Office 3,209,247
Patented Sept. 28, 1965

3,209,247
DIELECTRIC LOSS TYPE MOISTURE MEASUREMENT SYSTEM WITH ITS OUTPUT COMPARED AGAINST A REFERENCE LEVEL
Carver A. Mead, Pasadena, Marvin L. McBrayer, Alhambra, and Paul H. Conroy, Arcadia, Calif., assignors to Moisture Register Company, Alhambra, Calif., a corporation of California
Filed Oct. 19, 1960, Ser. No. 63,605
7 Claims. (Cl. 324—61)

The present invention relates generally to a system and apparatus for detecting, measuring, indicating or registering dielectric losses in a given sample under test; and the invention relates more particularly to a new and improved system and apparatus for indicating and registering the moisture content of a sample, or of a plurality of samples, as they are moved in sequence through the sensing head of the apparatus.

The invention is particularly useful in the manufacture of gypsum boards, and it will be described in that environment. However, it will become evident as the present description proceeds that the invention finds general utility in any application in which it is desired to determine dielectric losses of a material in a simple and improved manner.

In the manufacture of gypsum boards, it is usual for the boards to be formed in a multi-level kiln. Upon completion, the boards are fed out of the kiln in sequence. It is most important that the moisture content of the gypsum boards be observed and monitored as they are so fed out of the kiln. This is especially important, for if the boards are too dry they tend to calcine and turn to chalk; and on the other hand, if the boards are too moist they tend to form a wet mushy mass.

The appartus and system of the present invention can be used to indicate and register the moisture content of successive ones of the gypsum boards as they emerge from the kiln, so that the temperature and baffling in the kilns can be properly set and maintained for satisfactory moisture content in the boards. Of course, it should be reiterated that this particular application is but one of many fields of use for the moisture register of the invention.

It is, accordingly, an object of the present invention to provide an improved registering system and apparatus for use in a large number of different fields; and which can be utilized for measuring the moisture content of a sample composed, for example, of plaster, wood, paper, and the like.

Another object of the invention is to provide such an improved registering system and apparatus which is capable of measuring the dielectric losses in different types of materials for electronic and electrical purposes.

Another object of the invention is to provide such an improved system and apparatus which permits direct calibration of its associated recording and indicating instruments, and which is constructed to maintain a particular calibration of its instruments in the presence of variations in the supply voltage, or variations in ambient temperature or humidity, and which calibration is unaffected by aging of components.

A feature inherent in the embodiment of the invention to be described is the inclusion of a reference circuit means which establishes a reference level in the associated recording and indicating instruments; this reference level being indicative, for example, of the "safe" moisture content level of the sample under test and serving to facilitate reading of the instruments.

Another feature of the embodiment of the invention to be described is the provision of simple adjustment means for adapting the apparatus and system of the invention to different thicknesses and widths of the samples to be tested, so that the wide range of sample sizes may be tested without destroying the calibration of the associated indicating and recording instruments, or creating the necessity for the use of multiple scales or conversion factors in conjunction therewith.

Another feature of the invention is the provision therein of an improved sensing head across which the sample under test is passed, and of an improved coupling means for the sensing head so as to enable accurate and sensitive readings to be taken across the entire width of the sample under test.

The above and other objects and features of the invention, and the manner in which they are realized, will be best appreciated from a consideration of the following specification in conjunction with the accompanying drawings.

In the drawings:

FIGURE 2 is a circuit diagram of a suitable regulated power supply for use in the system and apparatus of FIGURE 1;

FIGURE 3 is a circuit diagram of a high frequency oscillator which also may be used to constitute one of the components of the system of FIGURE 1;

Figure 1:
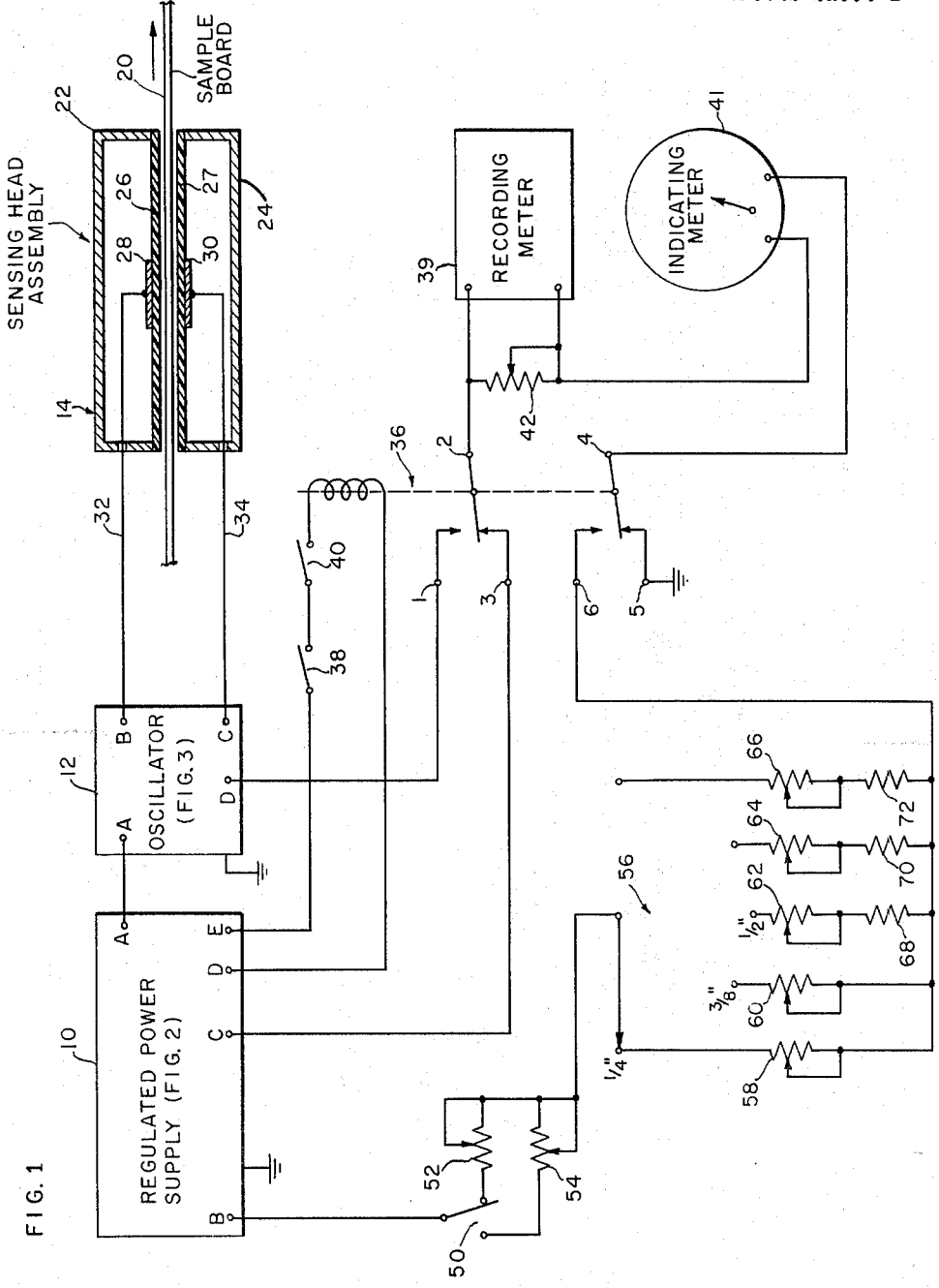
FIGURE 1 is a schematic representation, partially in block form and partially in circuitry, representing a system and apparatus constructed in accordance with one embodiment of the invention.

FIGURES 4a and 4b are schematic representations showing different coupling systems between the oscillator of FIGURE 3 and a sensing head which is associated with the apparatus to be described; and FIGURE 5 is a perspective view showing the mechanical details of the sensing head and certain components associated therewith, and also showing the manner by which the head may be mounted adjacent a conveyor which carries samples to be tested past the head.

As mentioned above, one application of the improved system and apparatus of the invention is for indicating and registering the moisture content of a sample under test. Also, in the example illustrated herein, the system and apparatus of the invention is applied to the measurement of moisture content of gysum boards, as the boards are sequentially moved by a conveyor past a sensing head which is included in the system and apparatus of the invention.

The present invention is of a type of moisture register in which the sample is used as a power absorbing load for an oscillating circuit. The dielectric losses of the sample absorb power from the oscillator, and this power absorption usually results in a current increase through the discharge tube incorporated in the oscillator. The resulting current increase in the oscillator discharge tube for this type of moisture register system is dependent upon the dielectric losses in the sample, as noted above, and these losses, in turn, are proportional to the moisture content of the sample.

In the embodiment of the invention to be described, the sensing head of the system and apparatus of the invention is coupled to a high frequency oscillator, and a high frequency electrostatic field is established between the electrodes of the head. The sample to be tested is then passed between the electrodes of the sensing head and through the electrostatic field established therebetween. The resulting variations in the current through the discharge tube in the oscillator are then utilized in the system to provide a recording of the moisture content of the sample.

In this latter type of misture registering system on which the present invention is predicated, the loading effects on the oscillator due to the composition of the sample and to other inherent characteristics of the sample are not predominant, and an accurate measure of moisture content can conveniently be obtained by observing and recording the variations in the curent from a reference level as successive samples are passed through the sensing head of the system.

The system of FIGURE 1 includes a regulated power supply 10, which may incorporate any suitable circuit. One particular appropriate circuit for the power supply is shown in FIGURE 2, and will be described in conjunction therewith. The regulated power supply 10 has a first output terminal A at which a regulated unidirectional potential is produced. This potential may have a value, for example, of 108 volts. This direct current potential is assumed to be established between the terminal A of the regulated power supply 10 and a point of reference potential, such as ground. The terminal A of the power supply 10 is connected to a terminal A of an oscillator 12. A suitable circuit for the oscillator 12 will be discussed in conjunction with FIGURE 3.

The oscillator 12 includes a pair of output terminals B and C which are connected to corresponding terminals of a sensing head assembly 14. The head assembly 14 is mounted in a manner to be described in conjunction with FIGURE 5, such that a sample board 20 is carried by a suitable conveyor between the upper and lower electrodes of the sensing head assembly. The sample 20 in the illustrated example of the invention is assumed, as noted, to be a gypsum board.

The sensing head assembly 14 includes an upper portion 22 and a lower portion 24. Each portion includes a housing which may have a rectangular configuration, and which may be formed of a suitable material, such as brass. The rectangular housing forming the upper portion 22 has a bottom which is enclosed by an insulating board 26 which may be formed, for example, of a suitable epoxy resin. The rectangular housing forming the lower portion 24 has an open top enclosed by an insulating board 27 which, likewise, may be formed of an epoxy resin. A first metallic strip 28 is formed on the inner surface of the board 26 by known printed circuit techniques, and this strip extends along the length of the board so as to extend across the width of the sample board 20. A similar metallic strip 30 is formed in like manner on the inner surface of the board 27, and the strip 30 extends for the length of the board 27, likewise to extend across the width of the sample board 20. The strips 28 and 30 may be composed of copper, for example, and they form a pair of electrodes between which a high frequency electrostatic field is established. The high frequency electrostatic field is established by connecting the terminal B and C of the oscillator 12 to the respective ones of the electrode strips 28 and 30 by the illustrated conductors 32 and 34. The sample board 20, as illustrated in FIGURE 1, is drawn by the conveyor through this electrostatic field. The dielectric losses of the sample board 20, which are proportional to the moisture content of the sample board, cause more or less power to be absorbed by the board 20 from the electrostatic field, and this power absorption is measured and registered by the system of the invention.

As will be described in conjunction with FIGURE 3, the terminals B and C of the oscillator 12 are connected to the resonant frequency-determining, or tank circuit of the oscillator, so that the sensing head assembly 14 (and the sample board 20) forms a load for the oscillator. The variations in power absorbed by this load are reflected by variations in the current through the discharge tube included in the oscillator, as mentioned above. These latter variations in current are converted to voltage variations in the embodiment of the invention to be described, and such voltage variations appear at the output terminal D of the oscillator.

The output terminal D of the oscillator is connected to the fixed contact 1 of a pair of normally open contacts 1–2 of a relay 36. The energizing coil of the relay 36 is connected through a pair of series-connected limit switches 38 and 40 to respective ones of a pair of output terminals D and E of the regulated power supply 10. The power supply introduces an alternating current voltage across the output terminals D and E and this voltage causes the relay 36 to become energized when both the limit switches 38 and 40 are closed. The actuation of the limit switches is under the control of the sample under test, as will be described.

The regulated power supply 10 also supplies an adjustable reference voltage at its output terminal C. The terminal C of the power supply 10 is connected to a pair of normally closed contacts 3–2 of the relay 36. The movable contact 2 of the relay 36 is connected through a recording meter 39, and through an indicating meter 41, to a second movable contact 4 of the relay 36. The recording meter 39 is shunted by a potentiometer 42. This potentiometer may have a resistance, for example, of 250 ohms, and it serves to calibrate the recording meter. The movable relay contact 4 is normally closed with a grounded fixed contact 5 of the relay 36, and it is in normally open relationship with a fixed contact 6 of the relay.

The regulated power supply includes a further output terminal B at which a "zero" control voltage is established, as will be described. The output terminal B of the power supply is connected to the movable contact of a single-pole double-throw switch 50. One of the fixed contacts of the switch 50 is connected to a potentiometer 52, and the other is connected to a potentiometer 54. These potentiometers 52 and 54 may each have a resistance, for example, of 10 kilo-ohms, and they are connected to the movable contact of a multi-contact switch 56.

The switch 56 has a plurality of fixed contacts which are connected to a corresponding plurality of potentiometers 58, 60, 62, 64 and 66. The potentiometers 62, 64 and 66 are connected to respective ones of a plurality of resistors 68, 70 and 72. The potentiometers 58 and 60, and the resistors 68, 70 and 72, are all connected to the fixed contact 6 of the relay 36. The potentiometers 58, 60, 62, 64 and 66 may each have a resistance, for example, of 2.4 kilo-ohms. The resistor 68 may have a resistance of 680 ohms, the resistor 70 may have a resistance of 2 kilo-ohms, and the resistor 72 may have a resistance of 15 kilo-ohms.

The potentiometers 52 and 54 may be individually adjusted to correspond to two different widths of sample boards 20 to be used in the system of FIGURE 1. Then, the switch 50 may be set to one of these widths or the other. In like manner, the potentiometers 58, 60, 62, 64 and 66 may be set to correspond to different thicknesses of the samples 20 to be tested, and the system set to any particular thickness, merely by setting the switch 56. In this way, the instruments 39 and 41 may be calibrated directly in "moisture content," and different widths and thicknesses of boards may be passed through the sensing head 14, without destroying the calibration. For this result, it is necessary merely to set the switches 50 and 56 to correspond to the particular width and thickness of the sample under test.

The limit switches 38 and 40 are mounted on the sensing head 14 to be actuated by the sample 20, as will be described in conjunction with FIGURE 5. At the beginning and ending of each sample board 20, one of these limit switches opens, so that no measurement is made of the leading and trailing ends of the board. This is desirable for the particular type of samples with which the described system is assumed to be used. This is because the leading and trailing ends of the sample boards 20 are usually particularly dry, and do not represent the actual moisture state of the over-all sample board.

When either one, or both, of the limit switches opens, the relay 36 is de-energized, so that the reference voltage from the terminal C of the regulated power supply is caused to pass through the meters 39 and 41. This voltage is adjusted preferably, to represent a "safe" level of moisture content. This provides a reference indication on the meters 39 and 41 of the "safe" level, and facilitates to a large extent the reading thereof, because deviations from the "safe" level can be ascertained at a glance.

As noted above, the voltage appearing at the output terminal C of the power supply 10, is transmitted to the contact 3 of the relay 36. When the relay 36 is in its energized condition, the recording meter 39 and indicating meter 41 are functioning normally. The recording meter 39 registers the different voltage values appearing at the terminal D which, in turn, are indicative of the moisture content of the sample board 20 as the board is drawn past the sensing head 14. The indicating meter 41 provides instantaneous readings of the moisture content of the sample 20. When the relay 36 is in its energized condition, the terminal D is connected to a series circuit including the recording meter 39 and its potentiometer 42; the indicating meter 41 which may be, for example, a micro-ammeter; and through the relay contacts 4-6 to a selected one of the potentiometers 50, 60, 62, 64 and 66. The circuit continues through the selected one of the two width control potentiometers 52 and 54, back to the terminal B of the regulated power supply 10.

The impedance of the recording meter 39 and of the indicating meter 41 is low. Therefore, the current flow through the circuit described above is basically limited by the selected thickness and width potentiometers. As the voltage on the output terminal D increases due to increasing moisture content of the gypsum board 20, the current through the recording meter 39 and indicating meter 41 increases. The meters 39 and 41 may be suitably calibrated to provide a direct indication of the moisture content of the sample.

As noted above, when the leading or trailing ends of the sample board 20 are passing through the sensing head 14, or when no sample is passing through the head; one or the other, or both, of the limit witches 38 and 40 are opened. This causes the relay 36 to be de-energized, so that a circuit through the meters 39 and 41 is established from the reference terminal C. This provides a convenient manner for assuring that the electronic circuits are operating properly, and it also facilitates the reading of the meters 39 and 41 by providing a reference "safe" indication on each of these meters.

For calibration purposes, it is desirable that the meters 39 and 41 read "zero" when no sample board passes through the sensing head 14 but the limit switches 38 and 40 are closed. This is achieved by the "zero" control potential which is derived from the output terminal B of the power supply 10. This potential is made equal to the potential developed at the terminal D of the oscillator 12 in the absence of a sample, but with both the limit switches 38 and 40 being closed.

As noted above, it is desired that for different thicknesses and widths of the different sample boards 20, the same calibrated readings on the meters should be available for determining moisture content. This enables the meters 39 and 41 to be calibrated directly into moisture content percentages on a single scale. This is accomplished, as described above, by the potentiometers 52 and 54 which are selectively switched into the circuit by the switch 50; and by the potentiometers 58, 60, 62, 64 and 66 which are selectively switched into the circuit by the switch 56. Each potentiometer of the group 58, 60, 62, 64 and 66 is adjusted for a different given thickness of sample board, so that when the selector switch 56 is set to a particular position corresponding to the thickness of the board being tested, the sensitivity of the system of the invention to moisture content is the same as for any of the other sample thicknesses.

As noted above, most gypsum boards derived from present-day kilns have areas on the leading and trailing edges, each approximately six inches long which are usually over-dried. Since these areas are not representative of the over-all moisture condition of the sample board, no measurement thereof is desired. In addition, it is desired that the recording meter 39 show not only the actual moisture content of these boards, but also the "safe," target or desired moisture reading for the boards.

The two series-connected limit switches 38 and 40, as described, are used to energize and de-energize the relay 36. The sample boards 20 passing underneath these limit switches actuate the control arms thereof, as shown in FIGURE 5, and open or close the respective switch contacts. When a sample board 20 passes through the sensing head 14 and closes both limit switches 38 and 40, the relay 36 will close thereby placing the meters 39 and 41 into operating condition, so that the metering circuits function as described above.

It should be noted that the leading edge of the sample board 20 must have passed beyond the sensing head 14 before the second limit switch 40 will close, and that the trailing edge of the sample board 20 cannot enter the sensing head without first opening the first limit switch 38. This action prevents readings from being recorded by the meter 39, or indicated by the meter, on the leading or trailing edges of the sample boards, because when either or both of the limit switches are opened, the relay 36 is de-energized. When the relay 36 is de-energized, the recording meter 39 and indicating meter 41 are disconnected from the control circuit and are connected to the reference circuit from the terminal C of the power supply 10. This reference supply, as will be described in conjunction with FIGURE 2, is a standard low voltage rectified power supply.

The reference output voltage at the terminal C is variable, for example, from 0 to approximately 20 millivolts, and this is sufficient to set the recording meter 39 and the indicating meter 41 readings at the desired reference point on their respective scales. In operation, the reference voltage at terminal C is set so that the recorded reference line on the chart of the meter 39 corresponds to the established "safe" moisture content reading. This, as mentioned above, permits a very rapid comparison between the moisture content of the sample 20 under test and the desired moisture content level. The latter level appears as a straight line on the chart of the recording meter 39 in the intervals when either, or both, the limit switches 38 or 40 are opened; and these intervals correspond to periods when no sample board 20 is passing through the sensing head assembly 14 so that both the limit switches are open, or when the leading or trailing edges of a sample board are passing through the sensing head so that one or the other of the limit switches is open.

The regulated power supply 10 of FIGURE 2 includes a usual power transformer 100. The primary winding of the transformer 100 is connected through an on-off switch 102 to a typical power plug 104. The power plug 104 may be the usual type which may be inserted into a 110-volt alternating current receptacle. The transformer 100 includes a first secondary winding 105 which is connected to the output terminals D and E of the power supply. These terminals, as described in conjunction with FIGURE 1, are connected to the relay 36, and they serve to energize the relay whenever the limit switches 38 and 40 are both closed.

The transformer 100 includes a second secondary winding 106 which is connected to the anodes of a full-wave rectifier tube 108. This rectifier tube may be of the type presently designated 5Y3GT. The transformer 100 includes a filament winding 110 which is connected to the filament of the rectifier tube 108 through a variable resistor 112. The filament winding is also connected to a resistor 114, and to a filter capacitor 116. The resistor 114 may have a resistance of 7.5 kilo-ohms, and the capacitor 116 may have a capacity of 4 microfarads. The capacitor 116 is connected to ground, as are a pair of voltage regulator tubes 118 and 120. The voltage regulator tube 118 is connected to the resistor 114, and to a resistor 122. The resistor 122 may have a resistance, for example, of 1.75 kilo-ohms. The voltage regulator tube 120, on the other hand, is connected to the output terminal A which, as mentioned above, is connected to the terminal A of the oscillator 12 to supply the exciting direct current potential to the oscillator.

The voltage regulator tube 120 is also connected to a resistor 124 which may have a resistance of 10 kilo-ohms. This resistor is connected to the cathode of a Zener diode 126 and to a resistor 128. The Zener diode may be of the type designated 1N468. The anode of the Zener diode is grounded. The resistor 128 may have a resistance of 500 ohms, and it is connected to a poteniometer 130. The potentiometer 130 may have a resistance of 1 kilo-ohm, and it is connected to a grounded resistor 132. The grounded resistor 132 may have a resistance of 390 ohms. The movable contact of the potentiometer 130 is connected to the output terminal B which, as described above, serves as the "zero" adjustment control.

The regulated power supply circuit 10 described above is a standard power supply circuit, and it uses common circuitry to provide a regulated direct current voltage of, for example, 108 volts, at the output terminal A for the oscillator 12. As noted above, in the presence of a sample board of moisture content approaching zero, it is desired that the meters 39 and 41 of FIGURE 1 indicate "zero." For that reason, the movable contact of the potentiometer 130 is adjusted so that the voltage at the output terminal B of the power supply 10 is equal to the voltage at the output terminal D of the oscillator 12 of FIGURE 1 in the presence of such a sample board.

The voltage developed at the terminal B of the power supply must be stable and constant in order that no zero drift of the meters 39 and 41 will occur. In order to accomplish this, a connection is made from the terminal A through the resistor 124, the lower end of the resistor being connected through the Zener diode 126. This Zener diode provides a precisely regulated constant voltage of approximately 5 volts, for example, in its usual manner across its electrodes. The voltage across the Zener diode is then applied to a voltage divider circuit which is made up of the resistors 128 and 132, and the "zero adjustment" potentiometer 130. The arm of the "zero adjustment" potentiometer 130 is connected to the terminal B of the power supply, and the reference voltage is developed at this arm. The arm may be adjusted to plus or minus a fraction of a volt in the range of voltages which appear at the output terminal D of the oscillator 12. This enables the voltage at the terminal B of the power supply to equalize the voltage appearing at that terminal D of the oscillator in the presence of a sample board exhibiting essentially zero moisture content. By this adjustment, the current through the recording meter 39 and through the indicating meter 41 of FIGURE 1 may be set to "zero" when a sample board of essentially zero moisture content is being conveyed through the electrode. The double regulation provided by the voltage regulators 118 and 120, and by the Zener diode 126, assures that no drift will occur in the zero voltage at the terminal B of the power supply, so that the zero point adjustment of the meters 39 and 41 will be stable.

The power supply of FIGURE 2 also supplies a regulated voltage to the "safe" or "desired" moisture content reference circuit described above. This regulated voltage is derived from a second transformer 150 whose primary is connected in shunt with the primary of the transformer 100. The transformer 150 has a secondary which is shunted by a plurality of pilot lamps 152. One side of the latter secondary is grounded, and the other side is connected through a resistor 154 to the anode of a rectifying diode 156.

The resistor 154 may have a resistance, for example, of 33 ohms, and the diode 156 may be of the type designated F6. The cathode of the diode is connected to a ground filter capacitor 158 and to a resistor 160. The capacitor 158 may have a capacity of 50 microfarads, whereas the resistor 160 may have a resistance of 1 kilo-ohm. The resistor 160 is connected to a potentiometer 162 which is grounded and which has a resistance, for example, of 50 ohms. The movable arm of the potentiometer 162 is connected to the output terminal C of the power supply 10 which, as described in conjunction with FIGURE 1, is connected to the fixed contact 3 of the relay 36.

The reference voltage developed at the terminal C of the regulated power supply 10 of FIGURE 2 is a low voltage rectified direct current potential. The circuit producing this reference voltage is a standard low voltage, rectified power supply consisting of the rectifier 156, the filter capacitor 158, and the resistor 160 and the potentiometer 162; the latter elements being used to lower the reference voltage at the terminal C to a level at which it can be used. The reference voltage at the terminal C is variable from 0 to approximately 20 millivolts, and as mentioned above, this voltage is sufficient to set the meters 39 and 41 to any desired "safe moisture content" point on their calibrated scales.

The terminal A of the power supply 10 supplies a direct current exciting potential to the input terminal A of the oscillator 12. The oscillator circuit 12 is shown in FIGURE 3. The disclosed oscillator is a push-pull oscillator circuit, operating class C, at a frequency of the order of 10 megacycles. The input terminal A of the oscillator is connected to a choke 200 and to a grounded capacitor 202. The choke 200 may have an inductance of 2.5 millihenries, for example, and the capacitor 202 may have a capacity of .002 microfarad. The choke coil is connected to the mid-point of an inductance coil 204. This inductance coil forms the resonant tank circuit for the oscillator 12.

The terminals of the inductance coil 204 are connected to the anodes of a double triode discharge tube 206. This tube may be of the type presently designated 5814A, this being a premium or ruggedized version of the 12AU7. The terminals of the inductance coil 204 are also connected to the output terminals B and C of the oscillator which, as described in conjunction with FIGURE 1, are connected to the sensing head assembly 14.

A capacitor 208 is connected to the left hand anode of the tube 206 and to the right hand control grid of that tube, this capacitor also being connected to a grounded resistor 210. The capacitor 208 may have a capacity, for example, of 50 micro-microfarads, whereas the resistor 210 may have a resistance of 1 megohm. In like manner, a capacitor 212 is connected to the right hand anode of the tube 206, and to the left hand control grid of that tube. This latter capacitor may have a capacity of 50 micro-microfarads, and it is also connected to a grounded resistor 214. The resistor 214 may have a resistance, for example, of 1 megohm.

The cathodes of the triode sections of the tube 206 are both connected to a grounded resistor 216 which is shunted by a capacitor 218. The resistor 216 may have a resistance of 3.9 kilo-ohms, and the capacitor may have a capacity of .01 microfarad. The ungrounded side of the resistor 216 is connected to the output terminal D of the oscillator, which in turn is connected to the relay contact 1 of FIGURE 1.

It is well known that when a class C oscillator such as shown in FIGURE 3 has a load applied to its resonant circuit, the oscillator tends to draw more current in order to supply power to the load. The load in the present case is caused by the dielectric losses in the sample 20 which is passed through the sensing head assembly 14 connected to the terminals B and C of the oscillator. The presence of the load which extracts power from the oscillator is recognized in the present circuit by an increase in the cathode current which, in turn, causes an increase in the potential across the cathode resistor 216. The potential across this resistor is proportional to the plate current drawn by the tube.

It is well established that the variation in the moisture content of the sample board 20 results in a corresponding variation in its dielectric losses which, in turn, produces a variation in the power absorbed by the sample. This power variation results in a variation in the plate current of the tube 206. Therefore, the potential across the resistor 216 is a measure of the moisture content of the sample passing through the sensing head. This potential, as described above, causes a current to flow through the metering circuit, so that an indication of this moisture content and a registration of the same is provided by the meters 39 and 41.

The composition of the sensing head 14 will now be described. As shown by the schematic diagrams of FIGURES 4a and 4b, the electrodes 28 and 30 of the sensing head actually form a transmission line, so that when a potential is applied across these electrodes at one end, as shown in FIGURE 4b, standing waves are established along the electrodes. The views of FIGURES 4a and 4b are from directly in front of the assembly, so that the sample board 20 is assumed to be rising up out of the plane of the paper, and the sample board is viewed so that its width dimension is visible. The production of the standing waves described above, therefore, cause the head assembly 14 to be more sensitive at different points across the width of the sample board 20 where the electric field is near maximum, than at other points across the width of the sample at which the electric field is near minimum. In the arrangement of FIGURE 4b, therefore, it is possible for readings to be taken along a portion of the width of the sample board instead of across its entire width, and these readings may not be indicative of the actual moisture content of the board across its entire width.

It has been found that when one of the connections to the electrodes 28 and 30 is made at an intermediate point on the electrode, as shown in FIGURE 4a, and the connection to the other electrode is made at the end, the resulting field between the electrodes is such that no clearly defined standing waves are established, and the electric field is substantially uniform across the entire width of the sample 20. The connections of FIGURE 4a, therefore, are suitable for providing readings which indicate an average moisture content across the entire width of the sample board, rather than the moisture content of small portions of the width of the board corresponding to the positions at which the standing waves have a maximum intensity.

It might be pointed out that the electrodes 28 and 30 of FIGURES 4a and 4b may, under some circumstances, actually form the tank circuit of the oscillator of FIGURE 3, thereby obviating the need for a separate inductance coil 204.

As shown in FIGURE 5, the sample board 20 is carried on a suitable conveyor system through the sensing head 14. As also illustrated in FIGURE 5, the limit switches 38 and 40 are supported by a housing 300 over the upper housing 22 of the sensing head. These switches have trigger arms which drag on the sample 20, and in the absence of the sample, these trigger arms, are spring-biased in a clockwise direction, for example, to cause their associated switches to open.

As also shown in FIGURE 5, the lower housing 24 is affixed to the upper housing 22 by connecting brackets, such as the brackets 302, 304, 306 and 308. The resulting assembly is mounted on the conveyor to extend across the conveyor in a position such that the sample board 20 carried by the conveyor passes between the upper housing 22 and lower housing 24, as shown.

As also illustrated in FIGURE 5, the connections from the oscillator extends through an appropriate plug and socket combination 312 which is mounted at one end of the housing 22. As described in conjunction with FIGURE 4a, the actual connections to the electrodes 28 and 30 in one embodiment of the invention are such that a connection is made to the end of the electrode 30, and to a mid-point on the electrode 28. These connections are used in installations in which it is important that an average reading of the moisture content across the entire width be obtained. For other applications, in which high sensitivity is required, and in which the variations in moisture content across the width of the sample are not material, the system of FIGURE 4b may be used.

The invention provides, therefore, a new and improved moisture register system which operates on the principle of radio frequency power absorption by the sample board, as the sample board passes through an electric field created by electrodes which are connected to the oscillator. The dielectric losses in the sample, which are a function of the moisture content, cause power to be extracted from the oscillator circuit, and this power extraction causes a larger plate current to flow in the oscillator as the oscillator supplies the required power. This larger plate current is reflected by a voltage change across the cathode resistor 216 (FIGURE 3) of the oscillator. This voltage across the resistor 216 is applied to a series circuit consisting of the meters 39 and 41 in FIGURE 1, and of the thickness calibrating potentiometers and width calibrating potentiometers; as well as the "zero adjustment" potentiometer 130, and resistor 132 of the regulated power supply of FIGURE 2. The current through this series circuit is directly proportional to the change in current through the oscillator tube 206, and, therefore, bears a direct relationship with the moisture content in the sample board 20.

The apparatus and system of the invention also includes a control, which is provided by the potentiometer 130 in FIGURE 2. This control is such that when no sample board 20 is passing through the sensing head 14, and both limit switches 38 and 40 are closed, or when a dry sample board of essentially "zero" moisture content is passing through the sensing head, the meters 39 and 41 will read 0.

The apparatus and system of the invention is also provided with preset sensitivity controls which may be switched into the circuit to provide the proper resistance for given thicknesses and widths of the sample board 20, so that a single calibrated scale can be used in each of the meters 39 and 41 for boards of different widths and thicknesses.

The apparatus and system of the invention is also provided with a reference circuit which allows the operator to select the reading which the meters 39 and 41 will show when no sample board is passing through the sensing head 14, or when the leading or trailing edges of a sample board are passing through the head. This reference circuit provides a predetermined current through the meters 39 and 41 to provide a reference reading in the meters, indicative of the "safe" or desired moisture content of the samples. This latter reading can be set to any desired level, by the appropriate adjustment of the potentiometer 162 in the regulated power supply of FIGURE 2.

We claim:

1. In a system for indicating the dielectric losses of a sample under test, the combination comprising: oscillator means for producing an electrical output; electrode means connected to said oscillator means to receive said electrical output and produce an electrical field; means for selectively passing a sample to be tested through said electric field; first circuit means connected to said oscillator means for deriving a first potential proportional to the electric current drawn by said oscillator means and the dielectric losses of the sample passed through said electric field; second circuit means for developing a second potential of a magnitude equal to the magnitude of said first potential proportional to the electric current drawn by said oscillator means for a zero reference dielectric loss in said sample; third circuit means for developing a third potential indicative of a reference safe level dielectric loss in said sample; voltage responsive means; and switching means for selectively connecting said voltage responsive means between said first and second circuit means when a sample is being passed through said electric field and connecting said voltage responsive means between said third circuit means and ground when no sample is being passed through said field.

2. In a system for indicating the dielectric losses of a sample under test, the combination comprising: oscillator means for producing an electrical output; electrode means connected to said oscillator means to receive said electrical output and produce an electrical field; means for selectively passing a simple to be tested through said electric field; first circuit means connected to said oscillator means for deriving a first potential proportional to the electric current drawn by said oscillator means and the dielectric losses of the sample passed through said electric field; second circuit means for developing a second potential of a magnitude equal to the magnitude of said first potential proportional to the electric current drawn by said oscillator means for a zero reference dielectric loss in said sample; third circuit means for developing a third potential indicative of a reference safe level dielectric loss in said sample; voltage responsive means; switching means for selectively connecting said voltage responsive means between said first and said second circuit means when a sample is being passed through said electric field and connecting said voltage responsive means between said third circuit means and ground when no sample is being passed through said field; and variable resistance means connected in series between said second circuit means and said switching means for varying the total series resistance in the electrical path therebetween in proportion to the thickness of the sample to be passed through said electric field.

3. A combination as set forth in claim 2, wherein said voltage responsive means is a meter.

4. In a system for indicating the dielectric losses of a sample under test, the combination comprising: oscillator means for producing an electrical output; electrode means connected to said oscillator means to receive said electrical output and produce an electrical field; means for selectively passing a sample to be tested through said electric field; first circuit means connected to said oscillator means for deriving a first potential proportional to the electric current drawn by said oscillator means and the dielectric losses of the sample passed through said electric field; second circuit means for developing a second potential of a magnitude equal to the magnitude of said first potential proportional to the electric current drawn by said oscillator means for a zero reference dielectric loss in said sample; third circuit means for developing a third potential indicative of a reference safe level dielectric loss in said sample; metering means selectively connected between said first and said second circuit means for indicating the difference between said first potential and said second potential; and switching means for selectively connecting said third circuit means to said metering means as a substitute for said first circuit means when there is no sample being passed through said electric field.

5. In a system for indicating the dielectric losses of a sample under test, the combination comprising: oscillator means for producing an electrical output; electrode means connected to said oscillator means to receive said electrical output and produce an electrical field through which the sample to be tested is passed; first circuit means connected to said oscillator means for deriving a first potential proportional to the electric current drawn by said oscillator means and the dielectric losses of the sample passed through said electric field; second circuit means for developing a second potential of a magnitude equal to the magnitude of said first potential proportional to the electric current drawn by said oscillator means for a zero reference dielectric loss in said sample; third circuit means for developing a third potential indicative of a reference safe level dielectric loss in said sample; metering means; dual position relay means for selectively connecting said first and said second potentials to said metering means in one position of said relay means and said third potential to said metering means in the second position of said relay means; and switching means actuated by the sample under test for controlling said relay means.

6. A combination as set forth in claim 5, wherein said switching means includes at least one limit switch actuated by said sample.

7. In a system for indicating the dielectric losses of a sample under test, the combination comprising: oscillator means for producing an electrical output; electrode means connected to said oscillator means to receive said electrical output and produce an electrical field through which the sample to be tested is passed; first circuit means connected to said oscillator means for deriving a first potential proportional to the electric current drawn by said oscillator means and the dielectric losses of the sample passed through said electric field; second circuit means for developing a second potential of a magnitude equal to the magnitude of said first potential proportional to the electric current drawn by said oscillator means for a zero reference dielectric loss in said sample; third circuit means for developing a third potential indicative of a reference safe level dielectric loss in said sample; metering means; dual position relay means for selectively connecting said first and said second potentials to said metering means in one position of said relay means and said third potential to said metering means in the second position of said relay means; and limit switching means actuated by the sample under test for controlling said relay means to cause said relay means to assume one position for a first portion of the travel of the sample through the electric field and to assume the other of its two positions for a second portion of the travel of the sample through the electric field.

References Cited by the Examiner

UNITED STATES PATENTS

| 1,824,745 | 9/31 | Allen | 324—61 |
| 1,878,109 | 9/32 | Clark | 324—61 |
| 2,395,425 | 2/46 | Osborne | 324—61 X |
| 2,654,864 | 10/53 | Tuck | 324—61 |
| 2,861,241 | 11/58 | Leonard et al. | 324—34 |

WALTER L. CARLSON, *Primary Examiner.*

SAMUEL BERNSTEIN, FREDERICK M. STRADER, *Examiners.*